United States Patent
Bartel et al.

[19]

[11] Patent Number: 5,898,230
[45] Date of Patent: Apr. 27, 1999

[54] MOTOR VEHICLE WITH A CENTRAL LOCKING UNIT AND A REMOTE CONTROL FOR ITS OPERATION

[75] Inventors: Peter Bartel, Hattingen; Klaus Kulik; Fred Welskopf, both of Herne, all of Germany

[73] Assignee: Kiekert AG, Heiligenhaus, Germany

[21] Appl. No.: 08/966,460

[22] Filed: Nov. 6, 1997

[30] Foreign Application Priority Data

Nov. 7, 1996 [DE] Germany .......................... 196 45 808

[51] Int. Cl.⁶ .......................................................... G06F 7/04
[52] U.S. Cl. ...................... 307/10.1; 307/10.2; 307/10.4; 340/825.69; 340/825.72; 340/825.34
[58] Field of Search .................................. 307/9.1–10.6; 340/825.03, 825.2, 825.3, 825.31, 825.34, 825.39, 825.58, 825.69, 825.72; 375/200, 202

[56] References Cited

U.S. PATENT DOCUMENTS

| | | | |
|---|---|---|---|
| 4,802,235 | 1/1989 | Treatch ....................................... | 455/76 |
| 5,210,771 | 5/1993 | Schaeffer et al. ........................ | 375/202 |
| 5,258,995 | 11/1993 | Su et al. .................................... | 375/202 |
| 5,268,933 | 12/1993 | Averbuch .................................. | 375/107 |
| 5,287,384 | 2/1994 | Avery et al. .............................. | 375/202 |
| 5,335,249 | 8/1994 | Krueger et al. .......................... | 375/202 |
| 5,379,047 | 1/1995 | Yokev et al. ............................. | 342/457 |
| 5,386,435 | 1/1995 | Cooper et al. ........................... | 375/202 |
| 5,398,258 | 3/1995 | Su et al. .................................... | 375/200 |
| 5,477,214 | 12/1995 | Bartel ....................................... | 340/825.31 |
| 5,506,863 | 4/1996 | Meidan et al. ........................... | 375/202 |
| 5,517,189 | 5/1996 | Bachhuber et al. ................. | 340/825.69 |
| 5,528,623 | 6/1996 | Foster, Jr. ................................ | 375/202 |
| 5,530,452 | 6/1996 | Yokev et al. ............................. | 342/457 |
| 5,590,410 | 12/1996 | Deutsch et al. ......................... | 375/202 |
| 5,712,512 | 1/1998 | Ostermann et al. .................... | 307/10.2 |
| 5,744,875 | 4/1998 | Kleefeldt et al. ....................... | 307/10.2 |

FOREIGN PATENT DOCUMENTS

| | | |
|---|---|---|
| 42 27 887 | 1/1994 | Germany . |
| 42 38 858 | 2/1994 | Germany . |

OTHER PUBLICATIONS

"Kommunikation Mit Bandpreiztechnik"; John Fakatselis et al; electronik industrie 2, 1996, pp. 33 to 38.

Primary Examiner—Jeffrey Gaffin
Assistant Examiner—Jonathan S. Kaplan
Attorney, Agent, or Firm—Herbert Dubno

[57] ABSTRACT

A central locking system of a motor vehicle is provided with communication between the transmitter of the remote actuation unit and the receiver of the central locking system in a frequency-hopping spread spectrum mode where M channels are used of a total of N channels of the spread spectrum frequency band chosen, for example, an I/S/M band of 433 MHz to 435 MHz. Switching is effected from one channel to another channel of the N channels in accordance with a timing pattern in which the timing interval $I_{zs}$ is greater than the duration $\Delta t$ of the communication protocol.

10 Claims, 5 Drawing Sheets

MOTOR VEHICLE WITH A CENTRAL LOCKING UNIT AND A REMOTE CONTROL FOR ITS OPERATION

FIELD OF THE INVENTION

Our present invention relates to a motor vehicle central locking system having a remote control and, more particularly, to a motor vehicle in which the communication between the remote control unit and the receiver in the vehicle is effected by a frequency hopping spread spectrum mode of communication.

BACKGROUND OF THE INVENTION

In a motor vehicle system with a remote control unit, the latter has a transmitter which functions as a key and is provided with a coding device. The receiver on the vehicle and connected with the door locks has a complementary decoder and communication between the two units can operate by high-frequency modulation so that commands are transmitted in a so-called communication protocol, are received in that protocol and converted to door-lock operations.

The transmitter and receiver operate in a given frequency band. Each communication protocol can comprise, inter alia, a starting bit, a fixed code portion which can coordinate the transmitter of the key with the receiver of the vehicle and a changeable code portion. The communication protocol is thus comprised of bits which can be "ones" and "zeros", "high" and "low" levels or signals which can be interpreted as "yes" and "no".

In the case of frequency modulation the signal frequency may be bits representing $\Delta f$ plus a carrier frequency or the carrier frequency minus $\Delta f$. $\Delta f$ can be, for example, 2.5 kHz. To ensure that no information is lost, the band width must be sufficiently large and one can operate, for example, at a frequency between 433 and 435 MHz, for example, the so-called Industrial/ Scientific/Medical band or ISM band.

Central locking units of the described type can be constructed as described in DE 42 27 887 C1 and DE 42 38 858 C1. The systems of these patents have been found to be effective in practice and reference may also be had to commonly-owned copending application Ser. No. 08/098, 481 filed Jul. 28, 1993.

These systems have been successful but when such systems are provided in vehicles which may be parked close enough together that their locking systems may be operated by transmitters held by their owners, there is nevertheless a problem.

This problem arises because of the close proximity of the frequencies with which communication is effected between the respective transmitters and receivers.

Furthermore, because other systems than vehicle transmitter keys are used in a given band, interference may be even more common.

There are, of course, places where communications are more secure as in the case, for example, for the military and it is known, for example, to use a spread-band technique where secret communication is desired (see for example "electronik industrie 2, 1996", pages 33 to 38). In this case, the useable frequency band is subdivided into a number of N frequency bands which are referred to as channels. A channel encompasses the carrier frequency and the frequency modulation for that carrier frequency of $\pm\Delta f$. The transmitter and receiver are synchronized to the same carrier frequency and the timing pattern switches channels, i.e. hops the channel, synchronously in the transmitter and receiver.

The spread spectrum communication technique is used not only because of the ability to transmit signals which cannot be readily intercepted, but also in cases in which communication is to be carried out in both a long distance and a close communication mode and where a variety of different signals are used. Commercially the spread spectrum technique can be used for cellular mobile communications, for cordless telephones, for global positioning systems using satellites and for so-called Personal Communication services.

OBJECTS OF THE INVENTION

It is the principal object of the present invention to provide an improved communication system between a central lock system of a motor vehicle and a transmitter whereby drawbacks of earlier vehicle-lock operating systems can be avoided.

Another object of the invention is to provide a system which can utilize frequency modulation in door-lock systems of the type described without the disadvantages which have been described.

SUMMARY OF THE INVENTION

These objects are attained, in accordance with the invention, in a central locking system for a motor vehicle which has a remote actuation unit including at least one transmitter acting as a key for the central locking system and provided with a coder. On the vehicle is a receiver with a complementary decoder, the coder and decoder operating with high-frequency modulation so that, for actuation of the central locking system, commands in the form of communication protocol are sent by the transmitter and picked up by the receiver.

According to the invention:

the remote-actuation unit is configured as a bandspread remote actuating device with a multiplicity of M channels and with N channels used in a frequency hopping spread spectrum mode, where ($M \leq N$);

switching is effected from one channel to another channel of the N channels in accordance with a timing pattern determined by a timing algorithm and with a certain time interval $I_{zs}$; and the time interval $I_{zs}$ of the timing pattern is greater than a duration $\Delta t$ of the communications protocol.

All that has been stated applies not only at the transmitter side, but also at the receiver side so that synchronism is maintained between the two, i.e. the frequency hopping switching of the transmitter from one channel to the other coincides with hopping of the channels at the receiver side as well as with the corresponding channels being selected.

Advantageously the multiplicity of M channels is equal to the number of N channels used in the frequency-hopping spread spectrum mode so that M=N.

The time interval $I_{zs}$ of the timing pattern and thus the duration in which each channel is effective can be small or large as long as it fulfills the condition that this time interval is greater than the duration At of the communication protocol. The switching from one channel to the next channel can be effected in a cycling time which can be of the order of seconds, minutes or even hours.

The invention is based upon our discovery that the "cross talk" and like interference resulting from the operation of a transmitter for a nearby similar vehicle with a similar communication frequency can be completely avoided when the remote operation of the vehicle is effected in a spread-spectrum frequency-hopping mode. In this case, even long time intervals $I_{zs}$, selected to be greater than the duration of the time period $\Delta t$ for transmission of the communication protocol, will have no adverse effect.

In practice it is found that dead time is avoided, i.e. there is no period at which actuation of the transmitter button will not cause a response of the locking system of the associated vehicle.

To increase the effectiveness of the system it is preferred and a feature of the invention that each frequency hop takes place immediately prior to the transmission and/or immediately after the transmission of a communication protocol. The timing pattern can thus be keyed or correlated with the actuation of the transmitter.

In a preferred embodiment of the invention, the interval $I_{zs}$ is not less than one second. Under this condition, ample tolerances in the installation are afforded and one can use as the operative frequency band, an official ISM frequency band, preferably 433 MHz to 435 MHz.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
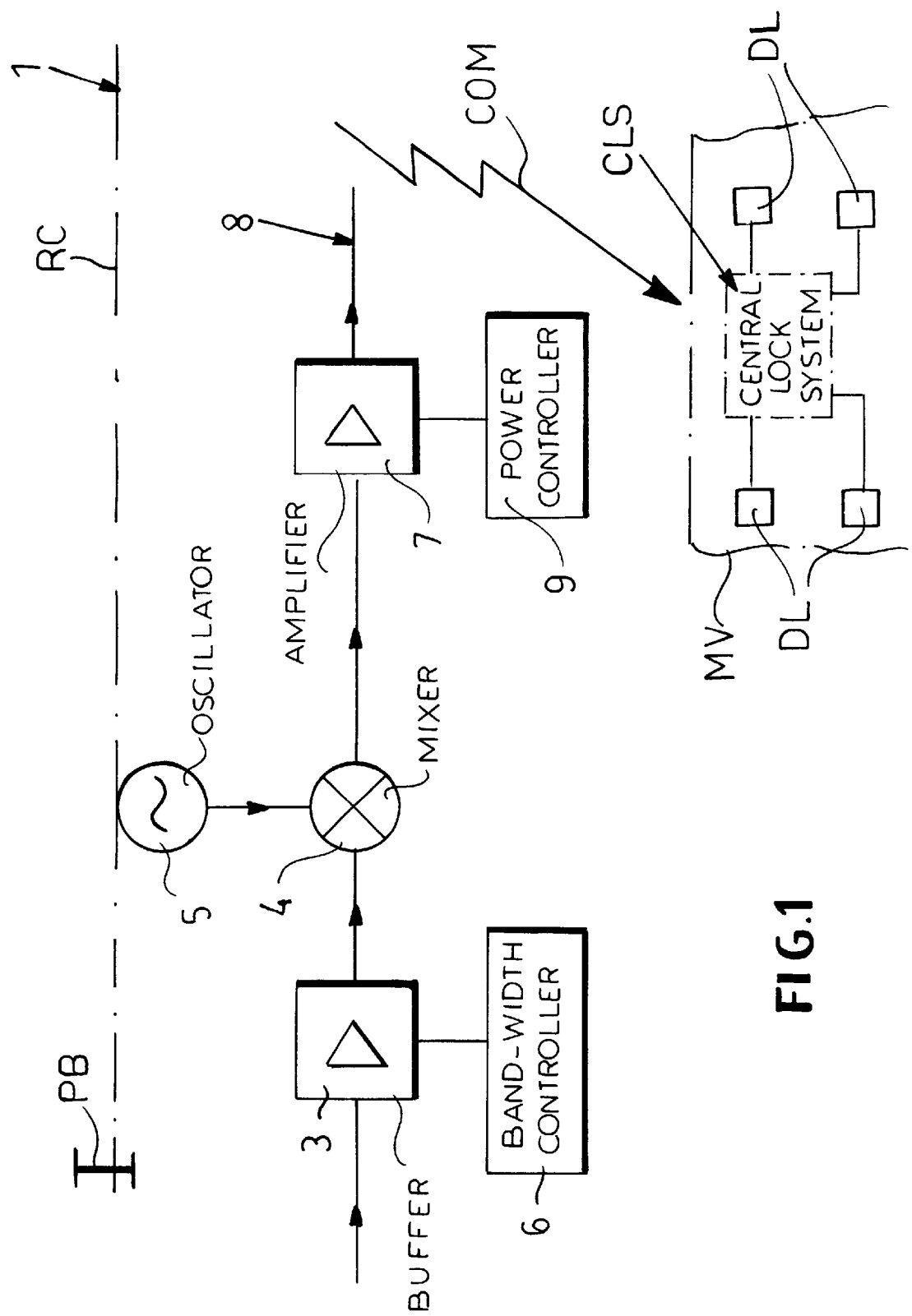
FIG. 1 is a diagram of a transmitter of the remote actuation unit of a motor vehicle with a central locking system in accordance with the invention.

In the drawing, the motor vehicle is represented diagrammatically at MV in FIG. 1 and includes a central lock system CLS connected to a plurality of door locks DL by separate lines or via a single line through multiplexing. Communication with the central lock system is represented diagrammatically by the arrow COM which represents a wireless communication technique. The receiver, as discussed below, is coded in the central lock system CLS. The coded remote actuation unit is represented as a whole at 1 and can be carried on the person of the vehicle user. It can be contained in a housing represented generally at RC.

The transmitter 1 of the remote actuator serves as a key for the operation of the central lock system CLS and thus includes a coder which codes a signal complementarily to that to which a decoder of the receiver 2 responds. The remote actuation unit operates with frequency modulation of high frequency electromagnetic waves. For operation of the central lock system, operating commands are sent by the transmitter 1 in the form of communication protocols and are received by the receiver 2 as communication protocols. The transmitter 1 can, for example, be actuated manually, e.g. by depression of a push button PB.

In the transmitter, information is sent via a buffer 3 to a so-called mixer which is also supplied with a carrier frequency from the oscillator 5. A band-width controller 6 is provided upstream of the mixer 4. The frequency modulated information is supplied to an amplifier 7 and emitted at 8. A power controller 9 is connected to the amplifier 7.

Figure 2:
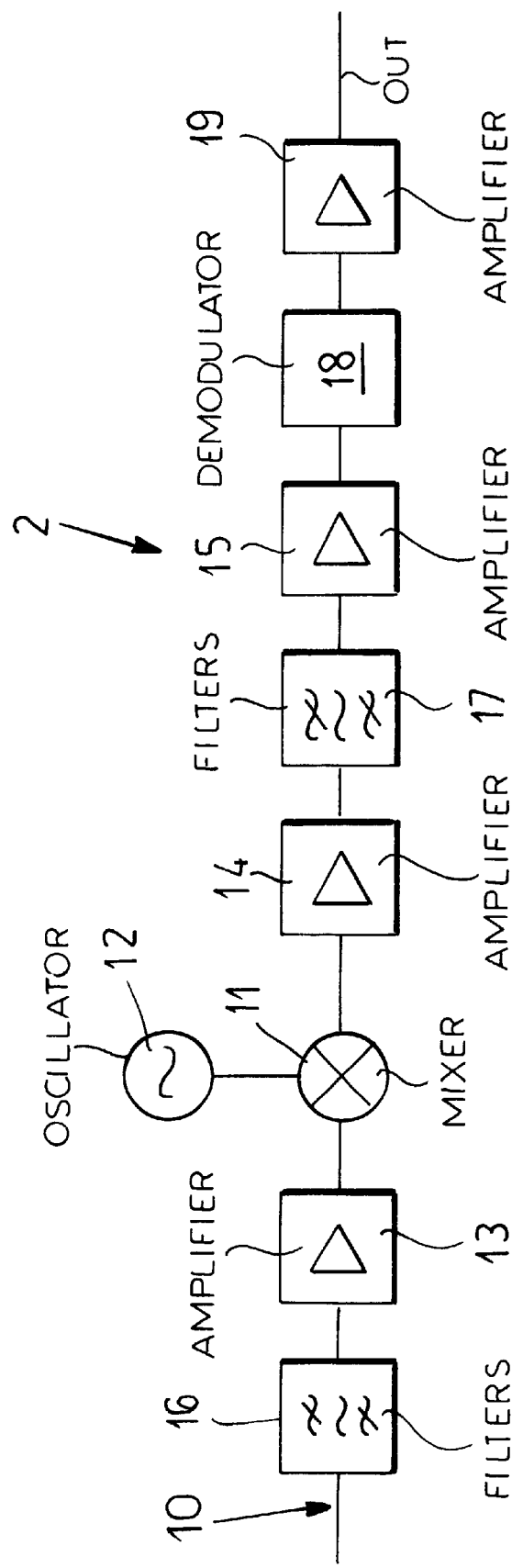
FIG. 2 is a diagram of a receiver responsive to the transmitter of FIG. 1.

FIG. 2 shows the receiver in the central lock system CLS of the motor vehicle MV. The receiver 2 picks up the transmitted information 8 at 10, preferably via a wireless link which can be an RF link or even a light or infrared link. In the latter case, appropriate transducers are provided at the output of the transmitter and the input 10 to the receiver. The receiver is also equipped, as is conventional with a mixer 11 connected to an oscillator 12 generating a fixed carrier frequency, amplifiers 13 and 14 and filters 16 and 17. Downstream a demodulator 18 is provided.

An amplifier 15 is provided upstream of the demodulator and a further amplifier 19 can be provided downstream thereof. The information leaving the receiver at the output OUT can be used to actuate the locks and, in particular, to switch them between a "locked" position, an "anti-theft" or "secured" position, an "unlocked" position and an "anti-theft off" position.

In the diagrams of FIGS. 1 and 2, the oscillators 5 and 12 generate fixed carrier frequencies which impart to the system a predetermined band width in one of the channels, particularly in the industrial/scientific/medical or ISM band.

Figure 3:
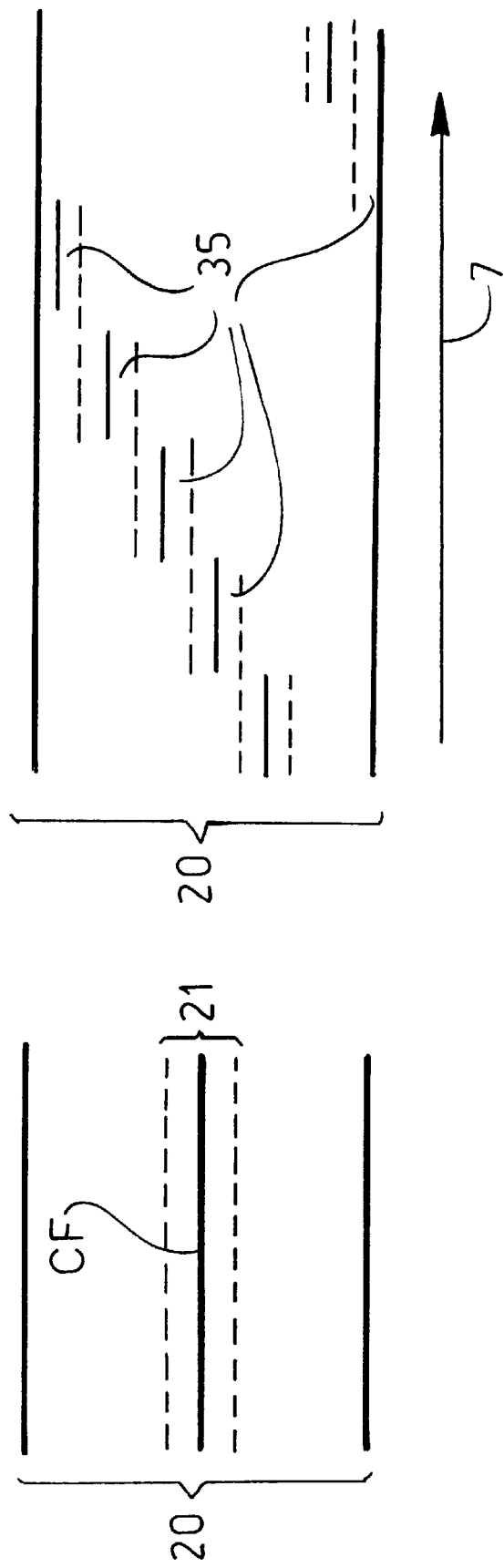
FIG. 3a and 3b are diagrams elucidating the spread band technique.

From FIG. 3a it will be apparent that this channel 21, within the band 20 comprises the carrier frequency CF±Δf as represented by broken lines in FIG. 3a. FIGS. 1, 2 and 3a, therefore, show an application of the system to single-channel use within a band 20. In practice, a band 20 of the band width illustrated can have 7 discrete channels or subbands as has been represented at 35 in FIG. 3b. The invention is a frequency-hopping spread spectrum system for the particular wireless communication associated with the central locking system and can use the additional components of the transmitter and receiver represented respectively in FIGS. 4 and 5 where reference numerals corresponding to those already described, signify the same components.

According to the invention within the frequency range which can contain N channels and in which M channels are used for the communication, M is less than or equal to N. Preferably M will be equal to N, i.e. all N available channels of the frequency range 20 will be used for communication between the remote actuator and the central lock system or base unit.

This means that these channels are switched in a time sequence one after the other in, say, the pattern 1, 2, 3 . . . N or are switched in accordance with some other algorithm so that the channels are shifted in other than the natural sequence or in some other pattern which will be in sequence between the transmitter and the receiver.

The time pattern can switch from one channel to another in seconds, minutes or hours in the cycling interval and it is possible to even effect the switching with millisecond intervals as long as a complete communications protocol can be transmitted between switching. The shorter the time interval for which each channel can be used, the higher are the tolerance requirements.

To counter drifting in the timing patterns at the transmitter and the receiver, after each actuation of the central locking unit, the counter state of the transmitter can be transferred to the receiver so that the two are resynchronized. A shifting of the frequency can be effected to counter drifting of the channels.

Figure 4:
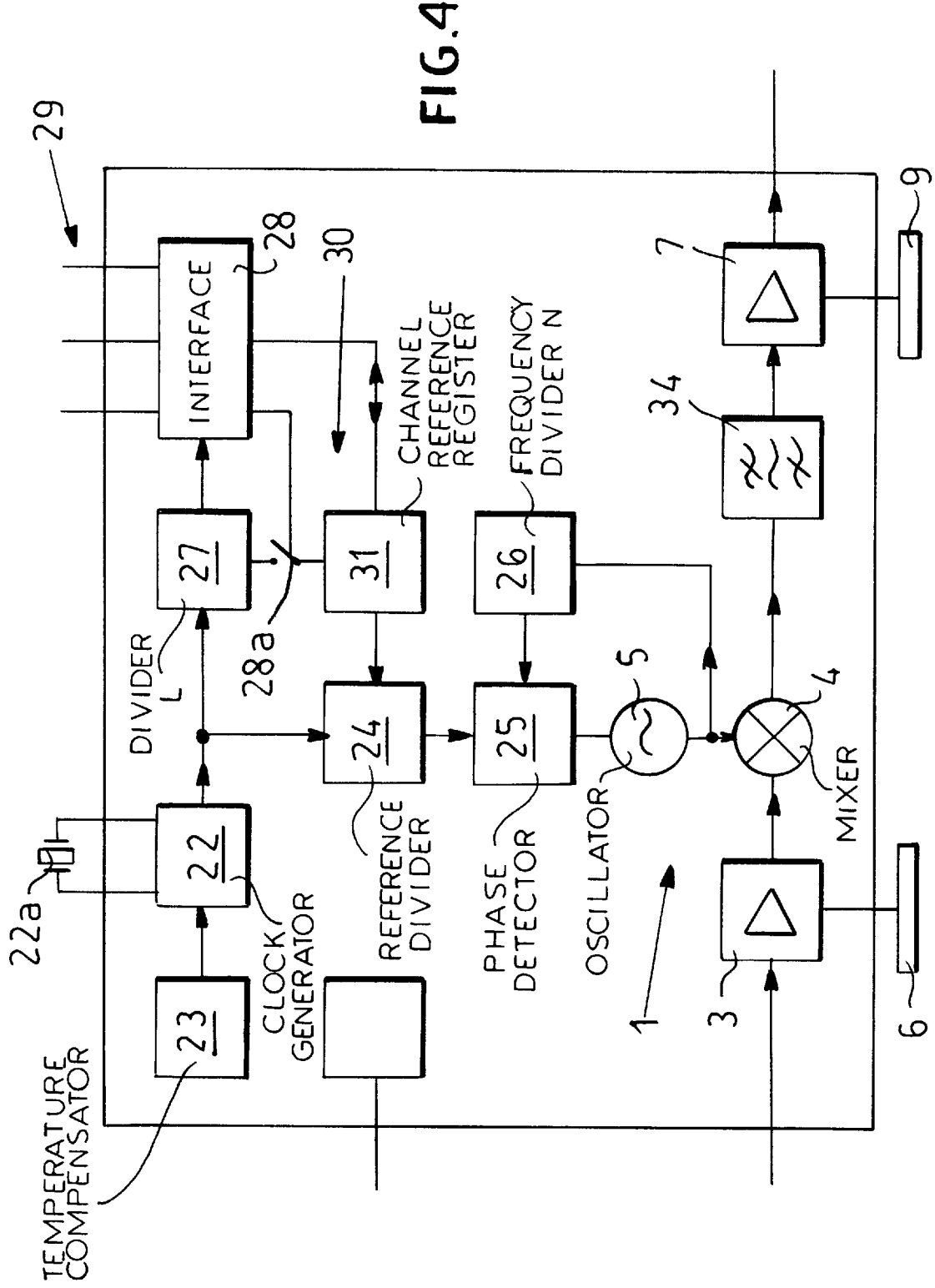
FIG. 4 is a block diagram of the transmitter according to the invention with the components required for the frequency-hopping spread spectral mode of operation.
Figure 5:
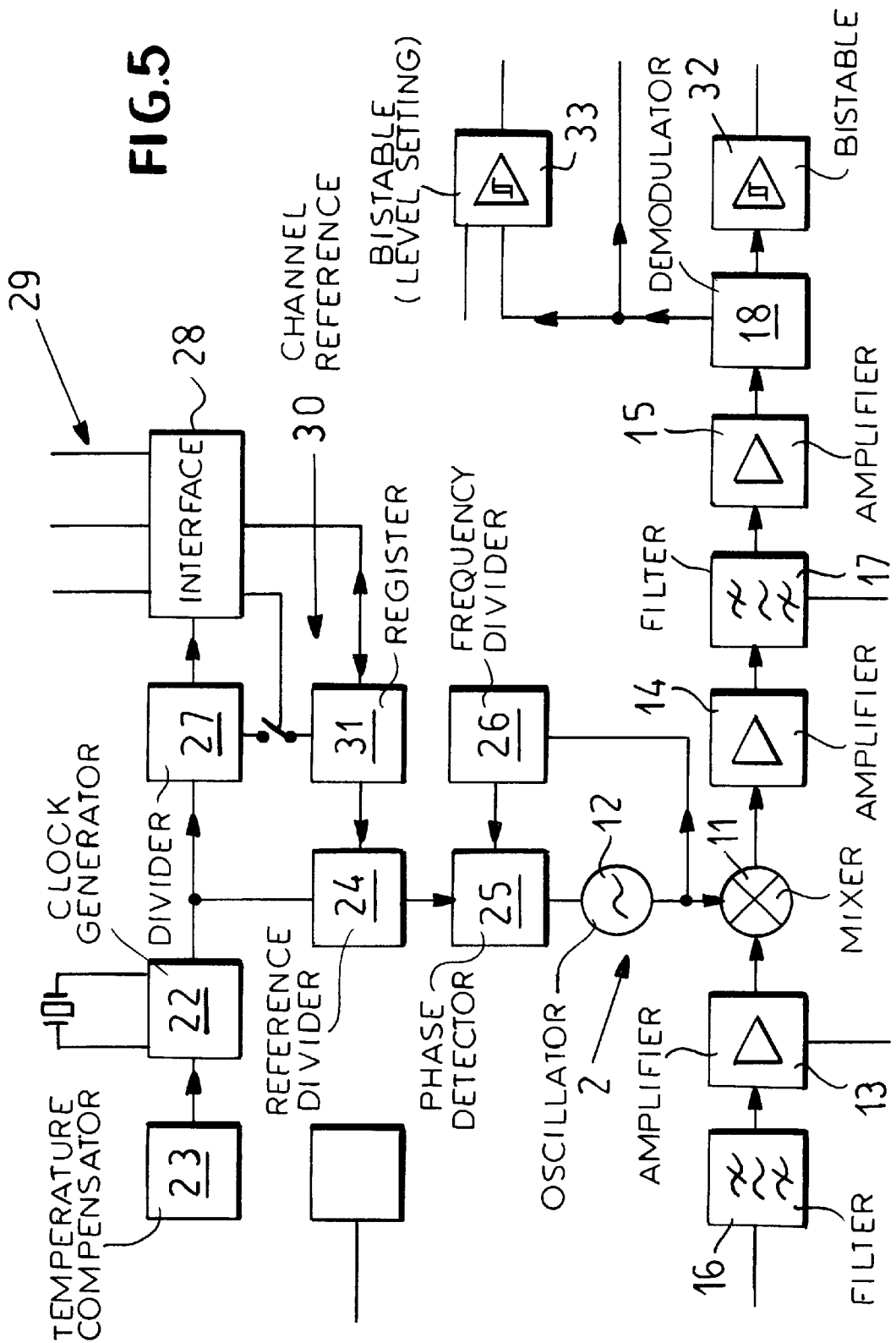
FIG. 5 is a block diagram of the receiver according to the invention with the components used for the frequency-hopping spread spectrum mode of operation.

FIGS. 4 and 5 show in greater detail the components of the transmitter and the receiver enabling use of the frequency-hopping approach according to the invention.

The transmitter and receiver are based upon an FSK small-band concept (i.e. frequency shift keying or FSK). For this purpose, the useable ISM band is subdivided into a number of N of equal width channels. Each channel encompasses the carrier frequency f and has a width between the limits f±Δf for frequency modulation. The transmitter 1 and the receiver 2 are synchronized at the same carrier frequencies so that information transmission can be effected, i.e. the timing patterns of the two must run synchronously.

The carrier frequency in the case of the transmitter of FIG. 4 is generated by a reference or clock generator 22 shown to have a control crystal 22a and in the form of a crystal control oscillator and any pulse shaper that may be required. The clock frequency can be, for example, 4 MHz or approximately $\frac{1}{100}$ of the frequency used for communication, i.e. the ISM frequency selected. A temperature compensator 23 is provided (see FIGS. 4 and 5) and is connected to the reference clock generator to maintain a highly precise and temperature-compensated clock frequency.

A frequency divider or multiplier, hereinafter referred to as a reference divider 24, increases the reference frequency by a factor M so that the set point carrier frequency is produced as a standard.

The factor M is variable, dependent upon the count of a register and is controlled by the register.

The oscillator 5 and the oscillator 12 are configured as VCOs (voltage-controlled oscillators) and output frequencies which are dependent upon the applied voltage.

The phase detector 25 compares the set point and actual value frequencies and supplies, as an output signal, a direct-current voltage to the respective oscillator 5 or 12. The actual frequency value is supplied to the phase detector from a frequency divider 26, which also can be referred to as a synthesizer divider, determining the fixed factor N.

In addition, a programmable divider 27, also referred to as a clock divider, is provided to supply a reference signal establishing the timing pattern and receiving an input from the clock generator and outputting a signal representing 1/hour or 1/day. The output of the clock divider 27 can be applied directly to an interface 28 which can be connected to "Sync" inputs of a microprocessor. The factor L representing the division factor of the divider 27 is also fixed after it has been set. A channel reference 30 can receive outputs of the divider 27 via a gate or switch 28a and can include a register 31.

The channel reference 30 then contains register 31 whose contents represent the selected channel of the ISM band. The register contents can be read by the microprocessor through the interface 28 to the extent that it is not in the microprocessor, and can be overwritten to the extent that it is not directly outputted by the clock divider 27. Furthermore, it is possible to provide an internal connection between the outputs of the clock divider 27 and channel reference 30 so that the register 31 is automatically countered up by the clock divider 27.

The frequency of the VCO can be adjustable in channel and for this purpose the synthesizer described can be operated in a phase-locked loop.

The reference divider 24 is a programmable divider which is fed with a reference frequency ($f_{ref}$) which supplies the value for the phase-locked loop (PLL) control circuit. The synthesizer divider 26 is also a programmable divider which forms the actual value for the phase detector 25 from the VCO frequency. The phase detector 25 compares set point and actual values and produces a control voltage which operates the VCO.

The synthesizer divider is characterized by the fact that the counter state is included in the channel reference 30 to establish the channel number in the receiving range. The high-frequency signal process in the receiver 2 is effected in accordance with the superheterodyne principle. The input signal and the oscillator signal are fed together to a mixer 11 so that a new frequency spectrum results (FIG. 5) with its intermediate frequency at a substantially lower level. In the description below, 1F equals the intermediate frequency. The HF signal which can be in the radio frequency or RF range passes through a prefilter 16 configured as an RF filter and through an RF amplifier 13 has an adjustable amplification so that matching of the sensitivity of the receiver 2 is here effected.

The starting parameter of the mixer 11 is the 1F signal which traverses the block amplifier 14 (1F amplifier), filter 17 (1F filter) and amplifier 15 (limiter amplifier). The filter 17 is matched in its band width to the channel spacing. The amplifier 15 (limiter amplifier) amplifies the 1F signal to the limiting range. In the demodulator 18 (FSK demodulator) there is effected a recovery of the data signal. A comparator 32 outputs the data signal in discrete levels.

Optionally the receiver 2 can generate the following information:

An RSSI signal which provides an analog image of the receiving field strength. From that the distance of the transmitter 1 from the receiver 2 can be determined.

An optional comparator 33 can be provided to which the RSSI voltage and a reference voltage ($V_{REF}$) can be supplied to enable the generation of a trigger signal at a predetermined output phase strength.

The transmitter 1 (FSK transmitter) can correspond in terms of the $f_{Ref}$ oscillator, the VCO, the phase-lock loop (PLL) and interface, to the receiver 2. In the mixer 4, the oscillator signal 5 is frequency-modulated by the data signal. Frequency-shift keying (FSK) is here used so that the HF carrier in principle will jump between two discrete frequencies, low and high. These frequencies are switched when the logic levels "low" and "high" are attained. The output signal of the mixer 4 passes through a filter 34 and is supplied to the amplifier 7 which has an adjustable power and amplification so that its output level is adjustable. In addition, the band width controller 6 (FIG. 4) is provided which can match the hop to the channel spacing.

In summary, the remote control unit is configured as a spread band remote control having M channels in a predetermined frequency band with a total of N channels. The frequency hopping technique is used to switch from one channel to another channel of the N channels in accordance with a timing program with an algorithm and a certain timing interval $I_{zs}$ and, in particular, such that the time interval $I_{zs}$ is greater than the time duration Δt of the particular transmission protocol. As an example and in a preferred embodiment of the invention, the number M of the channels coincides with the number N of the channels in the selected band.

The offset of the channels has been shown in FIG. 3b in which the time t is plotted along the abscissa while the frequency is plotted along the ordinate and the broken lines represent the boundaries between the channels. The lengths of the lines 35 represent the time intervals $I_{zs}$ which are greater than durations Δt of the transmission protocols. The time intervals can be small or large as desired and, for example, time intervals $I_{zs}$ can be selected. Best results and reliable transmission can be ensured when a period for the time interval $I_{zs}$ is selected which is five time the protocol duration which can be, for example, 200 ms. The time interval $I_{zs}$, therefore, may be 1 second.

A typical value for the output of the transmitter can be P=−15dBM or about 30 μW where P stands for the effective radio power. The unobstructed range can amount to about 50 m and when the system is built into a vehicle, can be $10^{30}$ m. The useable range can be subdivided into any optional number of channels and the number of channels and their band width can depend upon the width of the selected band. The selected band can be the ISM band as noted and a typical band width per channel can be 12.5 kHz.

We claim:

1. In a motor vehicle with a central locking system connected with a plurality of door locks, a remote-actuation unit including at least one transmitter acting as a key for the central locking system and having a coder, at least one receiver responsive to the transmitter and connected to the central locking system and having a decoder complementary to the coder and operating with high-frequency frequency modulation, whereby for operating the central locking system, commands are transmitted and received in a communications protocol, the improvement wherein:

the remote-actuation unit is configured as a bandspread remote actuating device with a multiplicity of M channels and with N channels used in a frequency hopping spread spectrum mode, where (M≦SN);

switching is effected from one channel to another channel of the N channels in accordance with a timing pattern determined by a timing algorithm and with a certain time interval $I_{zs}$;

the time interval $I_{zs}$ of the timing pattern is greater than a duration Δt of the communications protocol;

each timing pattern of the transmitter and the receiver is determined by a respective counter setting and to establish synchronism of the timing patterns after each operation of said system the counter state of the transmitters is transferred to the receiver;

a reference clock generator 16 provided for a carrier frequency generated by said transmitter; and said reference clock generator has a temperature compensator to maintain a precise temperature compensated clock frequency thereof.

2. The improvement defined in claim 1 wherein the multiplicity of M channels is equal to the number of N channels used in the frequency hopping spread spectrum mode so that M=N.

3. The improvement defined in claim 2 wherein the bandspread remote actuating device is used in said frequency hopping spread spectrum mode prior to transmission or after the transmission or both before and after the transmission of said communications protocol.

4. The improvement defined in claim 3 wherein the interval $I_{zs}$ is at least equal to 1 second.

5. The improvement defined in claim 4 wherein said frequency band is an official Industrial-Scientific-Medical frequency band.

6. The improvement defined in claim 5 wherein said frequency band is 433 MHz to 435 MHz.

7. The improvement defined in claim 1 wherein the bandspread remote actuating device is used in said frequency hopping spread spectrum mode prior to transmission or after the transmission or both before and after the transmission of said communications protocol.

8. The improvement defined in claim 1 wherein the interval $I_{zs}$ is at least equal to 1 second.

9. The improvement defined in claim 1 wherein said frequency band is an official Industrial-Scientific-Medical frequency band.

10. The improvement defined in claim 9 wherein said frequency band is 433 MHz to 435 MHz.

* * * * *